United States Patent
Feng et al.

(10) Patent No.: US 11,394,613 B2
(45) Date of Patent: *Jul. 19, 2022

(54) METHOD AND APPARATUS FOR REGULATING COMMUNICATION PARAMETERS

(71) Applicant: GUANGDONG OPPO MOBILE TELECOMMUNICATIONS CORP., LTD., Guangdong (CN)

(72) Inventors: Bin Feng, Guangdong (CN); Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/893,127

(22) Filed: Jun. 4, 2020

(65) Prior Publication Data
US 2020/0304370 A1   Sep. 24, 2020

Related U.S. Application Data

(63) Continuation of application No. 15/741,667, filed as application No. PCT/CN2015/089792 on Sep. 16, 2015, now Pat. No. 10,715,386.

(51) Int. Cl.
*H04L 41/0823* (2022.01)
*H04W 4/70* (2018.01)
(Continued)

(52) U.S. Cl.
CPC ...... *H04L 41/0823* (2013.01); *H04L 41/5025* (2013.01); *H04W 4/50* (2018.02);
(Continued)

(58) Field of Classification Search
CPC ............ H04L 41/0823; H04L 41/5025; H04L 69/323; H04L 43/08; H04L 1/16;
(Continued)

(56) References Cited

U.S. PATENT DOCUMENTS

| 8,422,577 B1 | 4/2013 | Shetty |
| 2006/0281471 A1 | 12/2006 | Shaffer |

(Continued)

FOREIGN PATENT DOCUMENTS

| CN | 1735224 A | 2/2006 |
| CN | 101431804 A | 5/2009 |

(Continued)

OTHER PUBLICATIONS

Definition of "relative" (Year: 2021).*
(Continued)

*Primary Examiner* — Obaidul Huq

(57) ABSTRACT

A method and equipment for regulating a communication parameter are provided. The method includes that: a first equipment establishes a communication with a second equipment according to a preset configuration of a Cyclic Prefix (CP) length; the first equipment regulates the configuration of the CP length according to a network state and/or service state in a communication process; and the first equipment sends CP length regulation indication information to the second equipment, the CP length regulation indication information indicating a result of regulation performed by the first equipment on the configuration of the CP length; wherein the first equipment is network equipment, and the second equipment is terminal equipment.

16 Claims, 8 Drawing Sheets

100

```
┌─────────────────────────────────────────────┐
│ A first equipment establishes a communication with a second
│ equipment according to preset configurations of communication  ├── S110
│ parameters                                   │
└─────────────────────────────────────────────┘
                      │
┌─────────────────────────────────────────────┐
│ The first equipment regulates the configurations of one or more of
│ the communication parameters according to a network state and/or ├── S120
│ service state in a communication process     │
└─────────────────────────────────────────────┘
                      │
┌─────────────────────────────────────────────┐
│ The first equipment sends communication parameter regulation
│ indication information to the second equipment, the communication
│ parameter regulation indication information indicating a result of ├── S130
│ regulation performed by the first equipment on the configurations of
│ the one or more of the communication parameters │
└─────────────────────────────────────────────┘
```

(51) Int. Cl.
*H04L 41/5025* (2022.01)
*H04W 4/50* (2018.01)
*H04W 24/02* (2009.01)
*H04W 72/04* (2009.01)
*H04L 69/323* (2022.01)
*H04L 43/08* (2022.01)
*H04W 48/20* (2009.01)
*H04W 74/08* (2009.01)

(52) U.S. Cl.
CPC ............ *H04W 4/70* (2018.02); *H04W 24/02* (2013.01); *H04W 72/0406* (2013.01); *H04L 43/08* (2013.01); *H04L 69/323* (2013.01); *H04W 48/20* (2013.01); *H04W 74/0833* (2013.01)

(58) Field of Classification Search
CPC .... H04L 41/0816; H04L 12/00; H04W 24/02; H04W 4/70; H04W 4/50; H04W 72/0406; H04W 48/20; H04W 74/0833
See application file for complete search history.

(56) References Cited

U.S. PATENT DOCUMENTS

| | | |
|---|---|---|
| 2009/0296833 A1 | 12/2009 | Sawahashi |
| 2010/0183029 A1 | 7/2010 | Yoshizawa |
| 2011/0222415 A1 | 9/2011 | Ramamurthi et al. |
| 2011/0269407 A1 | 11/2011 | Koo |
| 2012/0046066 A1 | 2/2012 | Tamura |
| 2012/0218982 A1 | 8/2012 | Lee |
| 2012/0281551 A1 | 11/2012 | Alanaerae |
| 2013/0022090 A1 | 1/2013 | Weng |
| 2013/0294363 A1 | 11/2013 | Feng |
| 2014/0269383 A1 | 9/2014 | He |
| 2014/0269779 A1 | 9/2014 | Shan |
| 2014/0286215 A1 | 9/2014 | Koc |
| 2014/0286302 A1 | 9/2014 | Khoryaev |
| 2014/0295856 A1 | 10/2014 | Chou |
| 2015/0023439 A1 | 1/2015 | Dimou et al. |
| 2015/0029874 A1 | 1/2015 | Davydov |
| 2015/0043438 A1 | 2/2015 | Fwu |
| 2015/0156045 A1 | 6/2015 | Lee et al. |
| 2015/0156767 A1 | 6/2015 | Yin et al. |
| 2015/0171939 A1 | 6/2015 | Davydov et al. |
| 2015/0230179 A1 | 8/2015 | Gupta |
| 2015/0230234 A1 | 8/2015 | Choi |
| 2015/0245221 A1 | 8/2015 | Heo |
| 2015/0249947 A1 | 9/2015 | Zhang |
| 2015/0249952 A1* | 9/2015 | Lee ................ H04W 48/10 370/312 |
| 2015/0341248 A1 | 11/2015 | Deng et al. |
| 2016/0007213 A1 | 1/2016 | Cui et al. |
| 2016/0119842 A1 | 4/2016 | Zhang et al. |
| 2016/0157241 A1 | 6/2016 | He et al. |
| 2016/0183281 A1 | 6/2016 | Yeh et al. |
| 2016/0192420 A1* | 6/2016 | Kim ................ H04W 74/002 370/329 |
| 2017/0238301 A1* | 8/2017 | Nakazawa ............ H04W 72/04 370/329 |
| 2018/0139729 A1* | 5/2018 | Zhou ................ H04L 27/2605 |

FOREIGN PATENT DOCUMENTS

| | | |
|---|---|---|
| CN | 101686178 A | 3/2010 |
| CN | 101765000 A | 6/2010 |
| CN | 101772091 A | 7/2010 |
| CN | 103428829 A | 12/2013 |
| CN | 103997434 A | 8/2014 |
| CN | 101431804 B | 12/2014 |
| CN | 104333465 A | 2/2015 |
| EP | 2264959 A1 | 12/2010 |
| EP | 2645758 A1 | 10/2013 |
| EP | 2779738 A1 | 9/2014 |
| EP | 2961205 A1 | 12/2015 |
| JP | 2006352379 A | 12/2006 |
| JP | 2011193471 A | 9/2011 |
| JP | 2013518508 A | 5/2013 |
| JP | 2020097877 A | 6/2020 |
| KR | 20090036966 A | 4/2009 |
| RU | 2520326 C2 | 6/2014 |
| WO | 2010037293 A1 | 4/2010 |
| WO | 2010050731 A2 | 5/2010 |
| WO | 2010082691 A2 | 7/2010 |
| WO | 2014070321 A1 | 5/2014 |
| WO | 2014127677 A1 | 8/2014 |
| WO | 2015002439 A1 | 1/2015 |
| WO | 2017041591 A1 | 3/2017 |

OTHER PUBLICATIONS

Second Office Action of the Australian application No. 2015409334, dated Jun. 26, 2020.
First Office Action of the Brazilian application No. BR1120180008168, dated Sep. 8, 2020.
Third Office Action of the Canadian application No. 2990488, dated Aug. 31, 2020.
Notice of Re-examination of the Chinese application No. 201580080433.5, dated Jul. 7, 2020.
Corrected Notice of Allowance in the U.S. Appl. No. 16/646,089, dated Jun. 11, 2020.
International Search Report in international application No. PCT/CN2015/089792, dated May 27, 2016.
English Translation of the Written Opinion of the International Search Authority in international application No. PCT/CN2015/089792, dated May 27, 2016.
Supplementary European Search Report in European application No. 15903866.0, dated Oct. 16, 2018.
First Office Action of the Indian application No. 201817003384, dated Feb. 28, 2020.
"LTE; Evolved Universal Terrestrial Radio Access (E-UTRA); Radio Resource Control (RRC); Protocol specification (3GPP TS 36.331 version 12.6.0 Release 12)", Technical Specification, European Telecommunications Standards Institute (ETSI), 650, Route Des Lucioles; F-06921 Sophia-Antipolis; France, vol. 3GPP RAN 2, No. V12.6.0, Jul. 1, 2015 (Jul. 1, 2015 ), XP014262351.
First Office Action of the Indonesian application No. P00201801594, dated Apr. 15, 2020.
First Office Action of the European application No. 15903866.0, dated Apr. 22, 2020.
Second Written Opinion of the Singaporean application No. 11201710873T, dated May 14, 2020.
First Office Action of the Chinese application No. 201580080433.5, dated Dec. 20, 2018.
First Office Action of the U.S. Appl. No. 15/741,667, dated Apr. 17, 2019.
Second Office Action of the U.S. Appl. No. 15/741,667, dated Aug. 30, 2019.
Final Office Action of the U.S. Appl. No. 15/741,667, dated Dec. 11, 2019.
Corrected Notice of Allowance of the U.S. Appl. No. 15/741,667, dated Apr. 3, 2020.
Written Opinion of the Singaporean application No. 11201710873T, dated Dec. 17, 2018.
First Office Action of the Canadian application No. 2990488, dated Oct. 25, 2018.
Second Office Action of the Canadian application No. 2990488, dated Oct. 1, 2019.
First Office Action of the Australian application No. 2015409334, dated Feb. 7, 2020.
First Office Action of the Russian application No. 2018105085, dated Mar. 18, 2019.
Notice of Allowance of the Russian application No. 2018105085, dated Jun. 28, 2019.
First Office Action of the Japanese application No. 2017-566387, dated May 7, 2019

(56) References Cited

OTHER PUBLICATIONS

Notice of Rejection of the Japanese application No. 2017-566387, dated Feb. 4, 2020
Notice of Allowance of the South African application No. 2017/08690, dated Oct. 4, 2018.
Notice of Allowance of the U.S. Appl. No. 15/741,667, dated Mar. 5, 2020.
First Office Action of the Israeli application No. 257430, dated Dec. 10, 2019.
Notice of Rejection of the Chinese application No. 201580080433.5, dated Jun. 12, 2019.
First Office Action of the Chilean application No. 201800460, dated Dec. 17, 2018
Second Office Action of the Chilean application No. 201800460, dated Jun. 24, 2019.
First Office Action after Appeal of the Japanese application No. 2017-566387, dated Jan. 5, 2021.
Second Office Action of the Israeli application No. 257430, dated Nov. 1, 2020.
Third Office Action of the Australian application No. 2015409334, dated Oct. 27, 2020.
First Office Action of the Malaysian application No. PI2017705071, dated Jan. 26, 2021.
Second Office Action of the Mexican application No. MX/a/2018/000946, dated Feb. 26, 2021.
Second Office Action of the European application No. 15903866.0, dated Feb. 8, 2021.
Re-examination Decision of the Chinese application No. 201580080433.5, dated Feb. 19, 2021.
Second Office Action of the Chinese application No. 201580080433.5, dated Apr. 25, 2021.
First Office Action of the Vietnamese application No. 1-2018-01400, dated Apr. 27, 2021.
First Office Action of the Korean application No. 10-2017-7036986, dated Jul. 1, 2021.
Fourth Office Action of the Canadian application No. 2990488, dated Jul. 7, 2021.
Third Office Action of the Israeli application No. 257430, dated Aug. 31, 2021.
Office Action of the Australian application No. 2021200786, dated Sep. 14, 2021.
First Office Action of the Japanese application No. 2020-097877, dated Sep. 21, 2021.
Third Office Action of the Chinese application No. 201580080433.5, dated Sep. 27, 2021.
Zeng Zhaohua, "Basic Principles and Key Technologies of LTE", Xidian University Press, May 2010, p. 47.
Peng Mugen et al., "Self-Organization Networking Technioques in Broadband Mobile Communication Systems", Beijing: Beijing University of Posts and Telecommunications Press, Oct. 2013, pp. 283-284.
Decision of Refusal of the Korean application No. 10-2017-7036986, dated Jan. 27, 2022.
Third Office Action of the European application No. 15903866.0, dated Feb. 23, 2022.
Fourth Office Action of the Chinese application No. 201580080433.5, dated Jan. 5, 2022.
Notice of Allowance of the Chinese application No. 201580080433.5, dated Mar. 21, 2022.
Second Office Action of the Australian application No. 2021200786, dated Mar. 16, 2022.
First Office Action after Re-Examination of the Korean application No. 10-2017-7036986, dated Mar. 22, 2022.
Second Office Action of the Japanese application No. 2020-097877, dated May 20, 2022.
Hearing Notice of the Indian application No. 201817003384, dated Mar. 30, 2022.
Fifth Office Action of the Canadian application No. 2990488, dated Mar. 22, 2022.

\* cited by examiner

200

```
┌─────────────────────────────────────────────────────┐
│ A second equipment establishes a communication with first │
│ equipment according to preset configurations of communication │ ~ S210
│ parameters │
└─────────────────────────────────────────────────────┘
                            │
┌─────────────────────────────────────────────────────┐
│ The second equipment sends processing capability indication │
│ information to the first equipment, the processing capability │
│ indication information indicating that the second equipment is │ ~ S230
│ capable of communicating with the first equipment by using the │
│ same parameter with different configurations │
└─────────────────────────────────────────────────────┘
                            │
┌─────────────────────────────────────────────────────┐
│ The second equipment receives communication parameter regulation │
│ indication information sent by the first equipment, the │
│ communication parameter regulation indication information │
│ indicating a result of regulation performed by the first equipment on │ ~ S220
│ the configurations of one or more of the communication parameters │
│ according to a network state and/or service state in a communication │
│ process │
└─────────────────────────────────────────────────────┘
```

FIG. 4

METHOD AND APPARATUS FOR REGULATING COMMUNICATION PARAMETERS

CROSS REFERENCE TO RELATED APPLICATIONS

This is a continuation application of U.S. application Ser. No. 15/741,667 filed on Sep. 16, 2015, which is an application for entering the US national stage of PCT/CN2015/089792, the entire contents of which are incorporated herein by reference in their entireties.

BACKGROUND

Considering equipment implementation and the like, a fixed or very limited small number of basic communication parameters, such as a carrier bandwidth, a slot or subframe length, a spreading factor of a CDMA system, a subcarrier spacing of an LTE system and a physical resource block granularity, are usually used in an existing wireless communication system, such as a Global System of Mobile Communication (GSM), a Code Division Multiple Access (CDMA) 2000 system, a Wideband Code Division Multiple Access (WCDMA) system and Long Term Evolution (LTE). Next-generation wireless communication systems need to support various applications, and thus need to effectively support large-range changes in indexes such as a bandwidth, a time delay, mobility, coverage, a communication rate, reliability and number of users. The existing system is unlikely to meet this requirement.

SUMMARY

The present disclosure relates to the field of communications, and more particularly, to a method and equipment for regulating a communication parameter, which may regulate the communication parameter according to a practical requirement and improve performance and applicability of a wireless communication system.

In a first aspect, there is provided a method for regulating a communication parameter, which may include that: a first equipment establishes a communication with a second equipment according to a preset configuration of a Cyclic Prefix (CP) length; the first equipment regulates the configuration of the CP length according to a network state and/or service state in a communication process; and the first equipment sends CP length regulation indication information to the second equipment, the CP length regulation indication information indicating a result of regulation performed by the first equipment on the configuration of the CP length; wherein the first equipment is network equipment, and the second equipment is terminal equipment.

In a second aspect, there is provided a method for regulating a communication parameter, which may include that: a second equipment establishes a communication with a first equipment according to a preset configuration of a CP length; and the second equipment receives CP length regulation indication information sent by the first equipment, the CP length regulation indication information indicating a result of regulation performed by the first equipment on the configuration of the CP length according to a network state and/or service state in a communication process; wherein the first equipment is network equipment, and the second equipment is terminal equipment.

In a third aspect, there is provided an equipment for regulating a communication parameter, which may include: a processor; and a memory configured to store instructions executable for the processor, wherein the processor is configured to establish a communication with a second equipment according to a preset configuration of a CP length, to regulate the configuration of the CP length according to a network state and/or service state in a communication process; and to send CP length regulation indication information to the second equipment, the CP length regulation indication information indicating a result of regulation performed by the equipment on the configuration of the CP length; wherein the equipment is network equipment, and the second equipment is terminal equipment.

In a fourth aspect, there is provided an equipment for regulating a communication parameter, which may include: a processor; and a memory configured to store instructions executable for the processor, wherein the processor is configured to establish a communication with first equipment according to a preset configuration of a CP length; and to receive CP length regulation indication information sent by the first equipment, the CP length regulation indication information indicating a result of regulation performed by the first equipment on the configuration of the CP length according to a network state and/or service state in a communication process; wherein the first equipment is network equipment, and the equipment is terminal equipment.

According to the method and equipment provided by embodiments of the present disclosure for regulating the communication parameters, based on the abovementioned technical characteristics, the network equipment or terminal equipments serving as two parties communicating with each other may dynamically regulate the communication parameters according to the network state and/or service state in the communication process, so that performance and applicability of a wireless communication system are improved.

BRIEF DESCRIPTION OF DRAWINGS

In order to describe the technical solutions of the embodiments of the present disclosure more clearly, the drawings referred to in the embodiments of the present disclosure will be briefly described below. It is apparent that the drawings described below are only some embodiments of the present disclosure. For those skilled in the art, other drawings may be obtained according to these drawings without creative work.

FIG. 4 is another schematic flowchart illustrating a method for regulating communication parameters according to another embodiment of the present disclosure.

DETAILED DESCRIPTION

Figure 1:
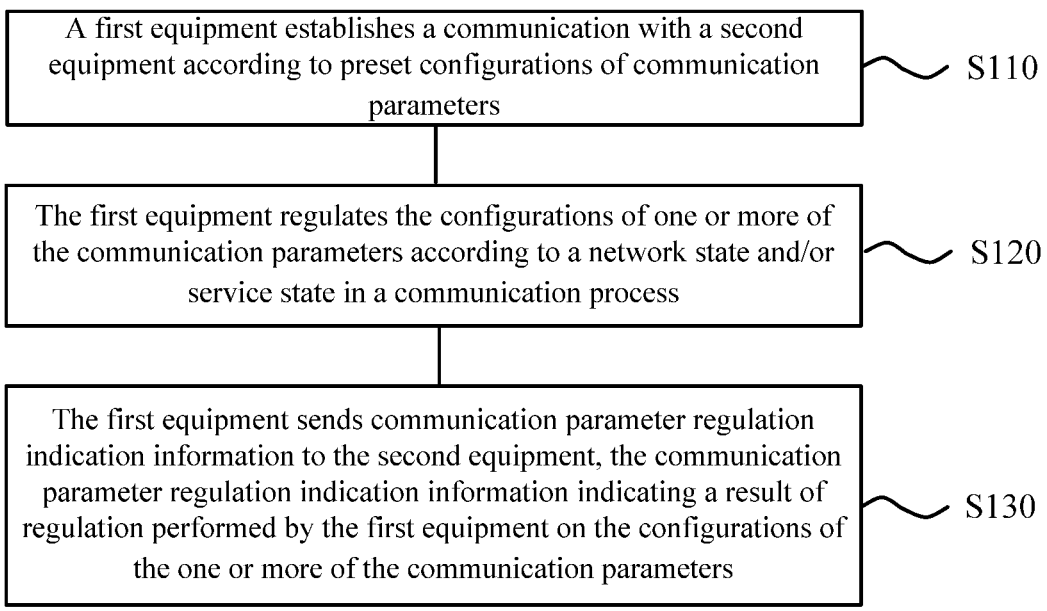
FIG. 1 is a schematic flowchart illustrating a method for regulating communication parameters according to an embodiment of the present disclosure.

The technical solutions in the embodiments of the present disclosure will be clearly and completely described below in conjunction with the drawings in the embodiments of the present disclosure. It is apparent that the described embodiments are not all embodiments but part of embodiments of the present disclosure. All other embodiments obtained by those skilled in the art on the basis of the embodiments in the present disclosure without creative work shall fall within the scope of protection of the present disclosure.

It is to be understood that the technical solutions of the embodiments of the present disclosure may be applied to various communication systems, for example, an LTE system, an LTE Frequency Division Duplex (FDD) system, LTE Time Division Duplex (TDD), a system adopting a hybrid duplex mode, a Universal Mobile Telecommunication System (UMTS), and a future 5th-Generation (5G) communication system.

It is to be understood that, in the embodiments of the present disclosure, terminal equipment may also be called as user equipment, a Mobile Station (MS), a mobile terminal or the like. The user equipment may communicate with one or more core networks through a Radio Access Network (RAN). For example, the user equipment may be a mobile phone (or called as a cell phone), a computer with a mobile terminal or the like. For example, the user equipment may be a portable, pocket, handheld, in-computer or vehicle-mounted mobile device, and terminal equipment in a future 5G network or terminal equipment in a future evolved Public Land Mobile Network (PLMN).

It is also to be understood that, in the embodiments of the present disclosure, network equipment may be equipment configured to communicate with the user equipment. The network equipment may be a Base Transceiver Station (BTS) in a GSM or CDMA, or a NodeB (NB) in a WCDMA system, or an Evolutional Node B (eNB or eNodeB) in an LTE system, or the network equipment may be a relay station, an access point, vehicle-mounted equipment, wearable equipment, network-side equipment in the future 5G network or network equipment in the future evolved PLMN and the like.

The embodiments of the disclosure provide at least the following aspects.

In a first aspect, there is provided a method for regulating communication parameters, which may include that: a first equipment establishes a communication with a second equipment according to preset configurations of communication parameters; the first equipment regulates the configurations of one or more of the communication parameters according to a network state and/or service state in a communication process; and the first equipment sends communication parameter regulation indication information to the second equipment, the communication parameter regulation indication information indicating a result of regulation performed by the first equipment on the configurations of the one or more of the communication parameters.

In a second aspect, there is provided a method for regulating communication parameters, which may include that: a second equipment establishes a communication with a first equipment according to preset configurations of communication parameters; and the second equipment receives communication parameter regulation indication information sent by the first equipment, the communication parameter regulation indication information indicating a result of regulation performed by the first equipment on the configurations of one or more of the communication parameters according to a network state and/or service state in a communication process.

In a third aspect, there is provided an equipment for regulating communication parameters, which may include: a processing module, configured to establish a communication with a second equipment according to preset configurations of communication parameters, wherein the processing module is further configured to regulate the configurations of one or more of the communication parameters according to a network state and/or service state in a communication process; and a transceiver module, configured to send communication parameter regulation indication information to the second equipment, the communication parameter regulation indication information indicating a result of regulation performed by the equipment on the configurations of the one or more of the communication parameters.

In a fourth aspect, there is provided an equipment for regulating communication parameters, which may include: a processing module, configured to establish a communication with first equipment according to preset configurations of communication parameters; and a transceiver module, configured to receive communication parameter regulation indication information sent by the first equipment, the communication parameter regulation indication information indicating a result of regulation performed by the first equipment on the configurations of one or more of the communication parameters according to a network state and/or service state in a communication process.

FIG. 1 is a schematic flowchart illustrating a method for regulating communication parameters according to an embodiment of the present disclosure. The method may be executed by network equipment or terminal equipment. As illustrated in FIG. 1, the method 100 includes the following operations.

In S110, a first equipment establishes a communication with a second equipment according to preset configurations of communication parameters.

In S120, the first equipment regulates the configurations of one or more of the communication parameters according to a network state and/or service state in a communication process.

In S130, the first equipment sends communication parameter regulation indication information to the second equipment, the communication parameter regulation indication information indicating a result of regulation performed by the first equipment on the configurations of the one or more of the communication parameters.

In such a manner, according to the method for regulating the communication parameters in the embodiment of the present disclosure, network equipment, or terminal equipments serving as two parties communication with each other may dynamically regulate the configurations of the communication parameters according to the network state and/or service state in the communication process, so that performance and applicability of a wireless communication system are improved.

It is to be understood that, in the embodiment of the present disclosure, the first equipment may be a network equipment, and the second equipment is a terminal equipment, or the first equipment is a terminal equipment and the second equipment is another terminal equipment.

Figure 2:
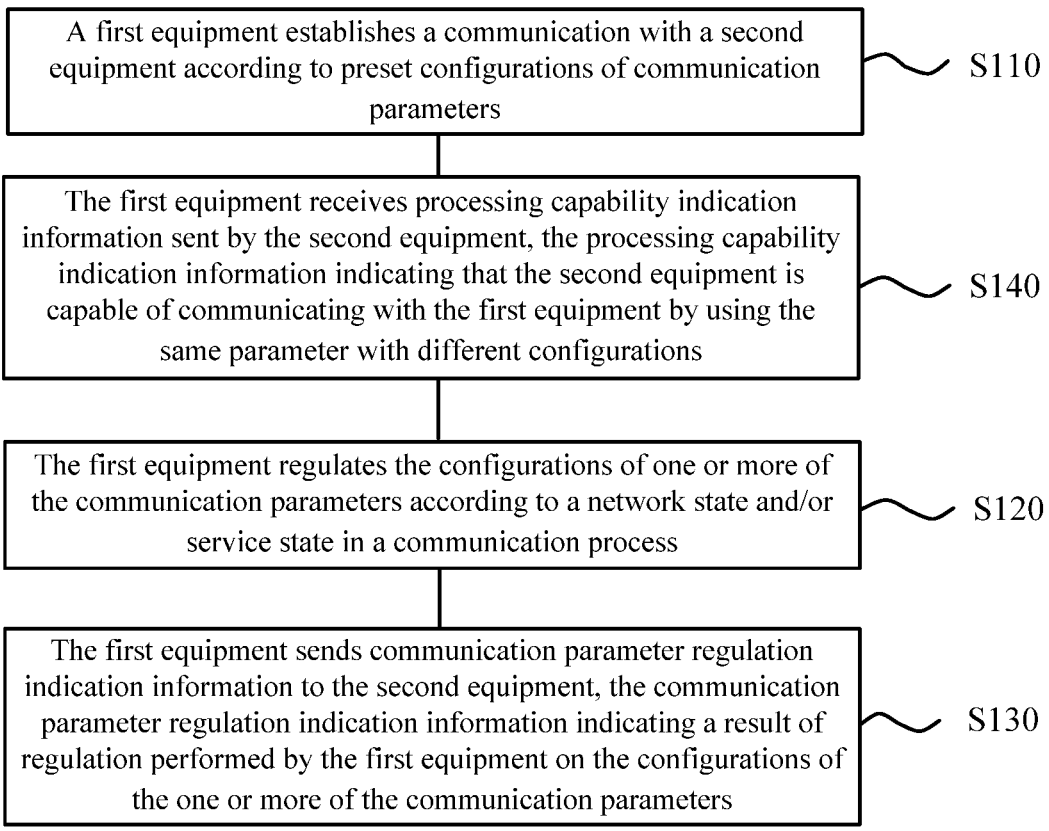
FIG. 2 is another schematic flowchart illustrating a method for regulating communication parameters according to an embodiment of the present disclosure.

Optionally, as illustrated in FIG. 2, the method may further include the following operations.

In S140, the first equipment receives processing capability indication information sent by the second equipment. The processing capability indication information may indicate that the second equipment is capable of communicating with the first equipment by using the same parameter with different configurations.

That is, the first equipment may regulate the communication parameters according to the network state and/or service state in the communication process only when determining that the second equipment is capable of communicating with the first equipment by using the same parameter with different configurations. In other words, in the embodiment of the present disclosure, in the same subcarrier/cell, different communication parameters may be used in time-frequency resource blocks allocated for different users, and therefore transmitters and receivers of the first equipment and the second equipment are required to have capabilities in processing multiple communication parameters simultaneously, and the equipments may be classified into different types according to capabilities of the equipments in simultaneously processing different parameters.

Furthermore, the second equipment may report, in an attach process after random access, a capability in communicating with the first equipment by using the same parameter with different configurations. For example, the second equipment may send an attach request message to the first equipment. The attach request message including the processing capability indication information. The second equipment may report a capability in a random access process. For example, the second equipment may contain capability data in a random access message. The second equipment may further report the capability to the first equipment according to equipment capability query information sent by the first equipment after the first equipment transmits the equipment capability query information. However, the present disclosure is not so limited thereto.

Optionally, in S110, the communication parameters are multiple access manners for communication and/or basic physical layer parameters corresponding to the multiple access manners. For example, the multiple access manners for communication may be Orthogonal Frequency Division Multiplexing Access (OFDMA)/Single-carrier Frequency-Division Multiple Access (SC-FDMA) and derivative multiple access manners or other multiple access manners probably to be used in a future communication system. Basic physical layer parameters corresponding to the OFDMA/SC-FDMA and derivative multiple access manners may include at least one of a subcarrier spacing, an OFDM symbol length, a Cyclic Prefix (CP) length, a sampling frequency, a reference signal density and pattern configured for purposes of channel estimation, demodulation and the like, a sequence construction of a reference signal and a resource window granularity.

That is, the network equipment, or the terminal equipments serving as the two parties communicating with each other may regulate the configurations of one or more of the parameters according to the network state and/or service state of a communication network where the network equipment and the terminal equipments are located. For example, the subcarrier spacing, the OFDM symbol length, the CP length, the sampling frequency, the reference signal density and image may be increased or decreased according to a practical requirement, wherein the reference signal density and image are configured for the purposes of channel estimation, demodulation and the like. For example, a relative motion between the two parties communicating with each other may cause a Doppler frequency shift. The Doppler frequency shift is greater if the relative motion is faster. For ensuring correct demodulation, it is necessary to increase the subcarrier spacing and simultaneously increase the reference signal density. A change in a channel environment may cause phenomena such as delay spread, angular spread, propagation loss, penetration loss and the like. In addition, when a propagation environment is more complicated, when there are more obstacles, and when sizes of the obstacles are larger, transmission delay spread is greater. In such case, the CP length needs to be increased. The network equipment or the terminal equipments serving as the two parties communicating with each other may regulate the sequence construction of the reference signal according to the practical requirement. For example, the network equipment or the terminal equipments serving as the two parties communicating with each other may regulate a sequence function for generating the reference signal from a quasi-orthogonal sequence to a pseudo-random code, a Zadoff-Chu sequence or the like. The network equipment or the terminal equipments serving as the two parties communicating with each other may also regulate the resource window granularity (i e minimum sizes of a resource window on a frequency domain and a time domain) according to the practical requirement.

Optionally, in S110, the preset configurations of the communication parameters may be default configurations. In other words, the communication parameters may be default parameters. For Device-to-Device (D2D) communication, the terminal equipment may broadcast the default parameters through a discovery channel. And different frequency bands and different geographical regions may have different default parameters.

Moreover, optionally, in S110, the preset configurations of the communication parameters may be configurations predetermined by the two parties communicating with each other in the random access process. Specifically, the network equipment or the terminal equipments serving as the two parties communicating with each other may determine the preset configurations of the communication parameters according to at least one of: condition of a wireless channel transmission between the first equipment and the second equipment, communication capabilities of the first equipment and the second equipment and a service type for which the second equipment initiates random access. The first equipment sends the preset configurations of the communication parameters to the second equipment after determining the preset configurations of the communication parameters.

Optionally, the first equipment may also obtain the condition of the wireless channel transmission between the first equipment and the second equipment from random access information initiated by other equipment instead of the second equipment before the communication is established with the second equipment. Alternatively, the first equipment may further acquire the condition of the wireless channel transmission between the first equipment and the second equipment from data and signaling sent by the equipment which has communicated with the first equipment, or from channel state indicator information fed back by the equipment. The communication capabilities of the first equipment and the second equipment include, but not limited to the number of transmitting and receiving antennas, transmitted power, receiving sensitivity, and a bandwidth used for communication.

Specifically, the network equipment or the terminal equipments serving as the two parties communicating with each other may determine configurations of the communication parameters when the terminal equipments accesses the communication network for the first time, according to information such as the channel condition obtained by random access sequence estimation, a determined distance between the two parties communicating with each other and a type of a service for which the terminal equipment initiates random access. For example, in the random access process, the network equipment may decide to allocate a frequency band for a certain piece of terminal equipment to use according to a service requirement or other information. And the frequency band may be or may be not a frequency band where the terminal equipment initiates random access.

Optionally, the first equipment may send the preset configurations of the communication parameters to the second equipment by containing the preset configurations of the communication parameters in a random access response message. The first equipment may also send the preset configurations of the communication parameters to the second equipment by sending another message containing the preset configurations of the communication parameters to the second equipment.

Optionally, in S120, the network state may include at least one of: a channel environment between the first equipment and the second equipment, a load and interference of a communication network where the first equipment and the second equipment are located, a requirement of an application on a data rate, and a requirement of the application on energy consumption.

Specifically, when the network state changes in the communication process, the network equipment or the terminal equipments serving as the two parties communicating with each other may regulate the configurations of the communication parameters in real time. The network state may change due to a change of the channel environment between the terminal equipment and the network equipment (for example, a base station in service and a neighbor base station) or due to a change of the terminal equipments serving as the two parties communicating with each other, for example, due to a channel change caused by the frequency band used in the communication process, antennae and mobility, or due to a channel environment change caused by mobility of the terminal equipments serving as the two parties communicating with each other. The network state may also change due to changes in load and interference of the network. The network state may also change due to changes in the requirement of the application in the network on the data rate and/or the requirement of the application in the network on the energy consumption. However, the present disclosure is not limited thereto.

In the embodiment of the present disclosure, optionally, the network equipment or the terminal equipments serving as the two parties communicating with each other may perform measurement by itself to obtain the network state and/or the service state. The network equipment or the terminal equipments serving as the two parties communicating with each other may also receive state information reported by the terminal equipment or the other terminal equipment serving as one of the two parties communicating with each other, and may acquire the network state and/or the service state according to the state information.

Optionally, S120 may specifically be implemented as follows: parameter regulation request information for requesting regulation on the configurations of one or more of the communication parameters is received from the second equipment; and the one or more of the communication parameters are regulated according to the parameter regulation request information.

That is, when a service is initiated by the second equipment or the service changes or a wireless signal environment changes, the second equipment may apply to the first equipment for parameter regulation. Optionally, the second equipment may send request information to the first equipment to request communication parameter regulation. The first equipment measures the network state by itself after receiving the request information. For example, the first equipment may judge whether the network state has changed or not according to quality of received data sent by the second equipment. Alternatively, the first equipment may judge whether the network state and/or the service state has/have changed or not by receiving a state report indicating the network state and/or the service state from terminal equipment of the same type with the second equipment in the communication network, and determine the specific communication parameters to be regulated. The first equipment may notify the regulation result to the second equipment after completing regulation.

Furthermore, a handshaking mechanism may be adopted for parameter regulation. That is, the first equipment is required to send Acknowledgement (ACK) information indicating an ACK of successful reception of the parameter regulation request information (for example, a reply may be given with an ACK frame), after receiving the parameter regulation request information sent by the second equipment. If the second equipment fails to receive from the first equipment a response to the parameter regulation request information within predetermined time period, the second equipment may resend the parameter regulation request information to the first equipment, or the second equipment may communicate with the first equipment still by adopting the configurations of the communication parameters which are used before applying for parameter regulation. The first equipment may receive and transmit information by using regulated and unregulated parameters.

Optionally, S120 is specifically implemented as follows: state information, which may indicate the network state and/or the service state may be received from the second equipment; and the configurations of one or more of the communication parameters may be regulated according to the state information.

Specifically, the second equipment may report the network state and/or the service state, for example, a channel quality change (a measurement result of the abovementioned Doppler frequency shift, transmission loss, the delay spread and the like or a channel quality indicator quantified by the measurement result), to the first equipment. The first equipment actively regulates the communication parameters and notify the regulation result to the second equipment, after receiving the network state and/or service state reported by the second equipment. The second equipment may regularly or irregularly report the network state and/or the service state to the first equipment, which will not be limited in the present disclosure.

Furthermore, the second equipment may report the network state and/or service state measured by itself to the first equipment and at the same time may send the parameter regulation request information applying for communication parameter regulation to the first equipment. After receiving the parameter regulation request information, the first equipment regulates the communication parameters according to the network state and/or service state reported by the second equipment, and notifies the regulation result to the second equipment.

Optionally, the first equipment may send the parameter regulation indication information to the second equipment through a physical layer control channel. For example, there may be multiple Radio Resource Control (RRC) connections between the two parties communicating with each other. Different RRC connections may have different communication parameters. Regulation of the communication parameters of each connection (carrier or base station) may be notified to the second equipment through a common physical layer control channel (i.e., a physical layer control channel shared by multiple connections), or an independent physical layer control channel for this connection. The physical layer control channel may be a new physical downlink control channel.

Alternatively, the first equipment may notify the parameter regulation result to the second equipment through a channel such as a paging channel or a broadcast channel. However, the present disclosure is not limited thereto.

Moreover, the first equipment may send only the regulation result of the regulated communication parameters to the second equipment. The first equipment may also send all of the regulated and unregulated communication parameters to the second equipment. Furthermore, the regulation result sent by the first equipment may be represented in form of an absolute value, or in form of a relative value. For example, it is assumed that the subcarrier spacing before regulation is 15 kHz. For weakening influence of the Doppler frequency shift on correct demodulation of a signal, it is necessary to increase the subcarrier spacing. In such case, the first equipment may directly notify the second equipment that the regulated subcarrier spacing is 20 kHz, or notify the second equipment that the regulated subcarrier spacing is 5 kHz larger than the unregulated subcarrier spacing. There are no limits made in the present disclosure.

In such a manner, according to the method for regulating the communication parameters in the embodiment of the present disclosure, the network equipment or the terminal equipments serving as the two parties communicating with each other may dynamically regulate the communication parameters according to the network state and/or service state in the communication process, so that the performance and applicability of the wireless communication system are improved.

The method for regulating the communication parameters according to the embodiment of the present disclosure is described above in detail on a first equipment side with reference to FIG. 1 and FIG. 2. The method for regulating the communication parameters according to another embodiment of the present disclosure will be described below in detail on a second equipment side in combination with FIG. 3 and FIG. 4. It is to be understood that interaction between the first equipment and the second equipment, related characteristics and functions and the like described on the first equipment side correspond to descriptions on the second equipment side, and for simplicity, descriptions are properly omitted.

Figure 3:
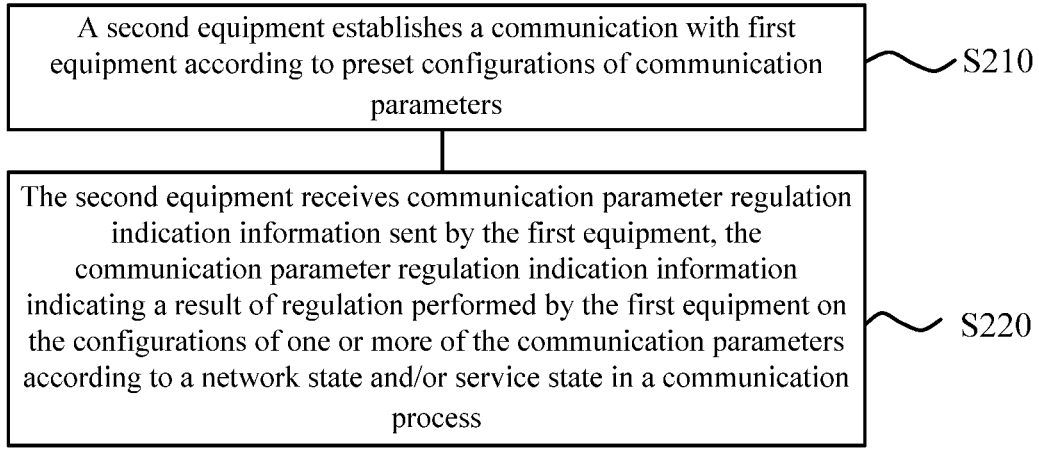
FIG. 3 is a schematic flowchart illustrating a method for regulating communication parameters according to another embodiment of the present disclosure.

FIG. 3 is a method for regulating communication parameters according to another embodiment of the present disclosure. The method may be executed by terminal equipment. As illustrated in FIG. 3, the method 200 includes the following operations.

In S210, a second equipment establishes a communication with a first equipment according to preset configurations of communication parameters.

In S220, the second equipment receives communication parameter regulation indication information sent by the first equipment. The communication parameter regulation indication information may indicates a result of regulation performed by the first equipment on the configurations of one or more of the communication parameters according to a network state and/or service state in a communication process.

In such a manner, according to the method for regulating the communication parameters in the embodiment of the present disclosure, the network equipment or terminal equipments serving as two parties communicating with each other may dynamically regulate the communication parameters according to the network state and/or service state, so that performance and applicability of a wireless communication system are improved.

Optionally, as illustrated in FIG. 4, the method may further include the following operations.

In S230, the second equipment sends processing capability indication information to the first equipment. The processing capability indication information may indicate that the second equipment is capable of communicating with the first equipment by using the same parameter with different configurations.

Optionally, S230 is specifically implemented as follows: an attach request message is sent to the first equipment. The attach request message may include the processing capability indication information.

In the embodiment of the present disclosure, optionally, the second equipment receives the preset configurations of the communication parameters from the first equipment. Here, the preset configurations of the communication parameters are determined by the first equipment according to at least one of: condition of a wireless channel transmission between the first equipment and the second equipment, communication capabilities of the first equipment and the second equipment, and a service type for which the second equipment initiates random access.

In the embodiment of the present disclosure, optionally, the second equipment may send parameter regulation request information to the first equipment for requesting regulation on the configurations of the one or more of the communication parameters, so as to cause the first equipment to regulate one or more of the communication parameters according to the parameter regulation request information.

In the embodiment of the present disclosure, optionally, after the second equipment sends the parameter regulation request information to the first equipment, the second equipment may receive ACK information, which may indicate an ACK of successful reception of the parameter regulation request information, from the first equipment.

In the embodiment of the present disclosure, optionally, the second equipment may send state information, which indicates the network state and/or the service state, to the first equipment to enable the first equipment to regulate the configurations of one or more of the communication parameters according to the state information.

Optionally, S220 is specifically implemented as follows: the parameter regulation indication information sent by the first equipment through a physical layer control channel is received.

In the embodiment of the present disclosure, optionally, the communication parameters may be multiple access manners for communication and/or basic physical layer parameters corresponding to the multiple access manners.

In the embodiment of the present disclosure, optionally, the network state includes at least one of a channel environment between the first equipment and the second equipment, a load and interference of a communication network where the first equipment and the second equipment are located, a requirement of an application on a data rate, and a requirement of the application on energy consumption.

In the embodiment of the present disclosure, optionally, the first equipment is a network equipment and the second equipment is a terminal equipment; or the first equipment is a terminal equipment and the second equipment is another terminal equipment.

In such a manner, according to the method for regulating the communication parameters in the embodiment of the present disclosure, the network equipment or the terminal equipments serving as the two parties communicating with each other may dynamically regulate the configurations of the communication parameters according to the network state and/or service state, so that the performance and applicability of the wireless communication system are improved.

Figure 5:
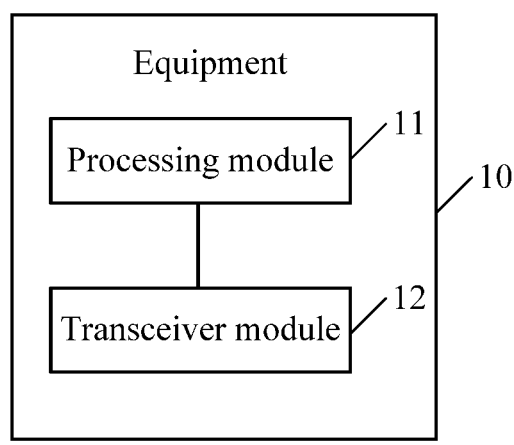
FIG. 5 is a schematic block diagram illustrating an equipment for regulating communication parameters according to an embodiment of the present disclosure.

FIG. 5 is a schematic block diagram illustrating an equipment for regulating communication parameters according to an embodiment of the present disclosure. As illustrated in FIG. 5, the equipment 10 includes a processing module 11 and a transceiver module 12.

The processing module 11 is configured to establish a communication with second equipment according to preset configurations of communication parameters.

The processing module 11 is further configured to regulate the configurations of one or more of the communication parameters according to a network state and/or service state in a communication process.

The transceiver module 12 is configured to send communication parameter regulation indication information to the second equipment. The communication parameter regulation indication information may indicate a result of regulation performed by the processing module on the configurations of one or more of the communication parameters.

In such a manner, the equipment for regulating the communication parameters in the embodiment of the present disclosure may dynamically regulate the configurations of the communication parameters according to the network state and/or service state, so that performance and applicability of a wireless communication system are improved.

In the embodiment of the present disclosure, optionally, the transceiver module 12 is further configured to receive processing capability indication information sent by the second equipment. The processing capability indication information may indicate that the second equipment is capable of communicating with the first equipment by using the same parameter with different configurations.

In the embodiment of the present disclosure, optionally, the transceiver module 12 is specifically configured to receive an attach request message sent by the second equipment. The attach request message include the processing capability indication information.

In the embodiment of the present disclosure, optionally, the processing module 11 is further configured to determine the preset configurations of the communication parameters according to at least one of: condition of a wireless channel transmission between the equipment and the second equipment, communication capabilities of the equipment and the second equipment, and a service type for which the second equipment initiates random access.

Here, the transceiver module 12 is further configured to send the preset configurations, determined by the processing module 11, of the communication parameters to the second equipment.

In the embodiment of the present disclosure, optionally, the transceiver module 12 is further configured to receive parameter regulation request information from the second equipment for requesting regulation on the configurations of the one or more of the communication parameters, Here, the processing module 11 is further configured to regulate one or more of the communication parameters according to the parameter regulation request information received by the transceiver module 12.

In the embodiment of the present disclosure, optionally, the transceiver module 12 is further configured to send ACK information, which indicates an ACK of successful reception of the parameter regulation request information, to the second equipment.

In the embodiment of the present disclosure, optionally, the transceiver module 12 is further configured to receive state information, which indicates the network state and/or the service state, from the second equipment.

Here, the processing module 11 is further configured to regulate the configurations of one or more of the communication parameters according to the state information received by the transceiver module 12.

In the embodiment of the present disclosure, optionally, the transceiver module 12 is specifically configured to send the parameter regulation indication information to the second equipment through a physical layer control channel.

In the embodiment of the present disclosure, optionally, the communication parameters are multiple access manners for communication and/or basic physical layer parameters corresponding to the multiple access manners.

In the embodiment of the present disclosure, optionally, the network state includes at least one of a channel environment between the equipment and the second equipment, a load and interference of a communication network where the equipment and the second equipment are located, a requirement of an application on a data rate, and a requirement of the application on energy consumption.

In the embodiment of the present disclosure, optionally, the equipment is network equipment and the second equipment is a terminal equipment; or the equipment is a terminal equipment and the second equipment is another terminal equipment.

In such a manner, the equipment for regulating the communication parameters in the embodiment of the present disclosure may dynamically regulate the configurations of the communication parameters according to the network state and/or service state, so that the performance and applicability of the wireless communication system are improved.

It is to be understood that the equipment 10 according to the embodiment of the present disclosure may correspondingly execute the method 100 for regulating the communication parameters in the embodiment of the present disclosure, and that the abovementioned and other operations and/or functions of various modules in the equipment 10 are intended to implement the corresponding flows of various methods in FIG. 1 and FIG. 2 respectively, and for simplicity, will not be elaborated herein.

Figure 6:
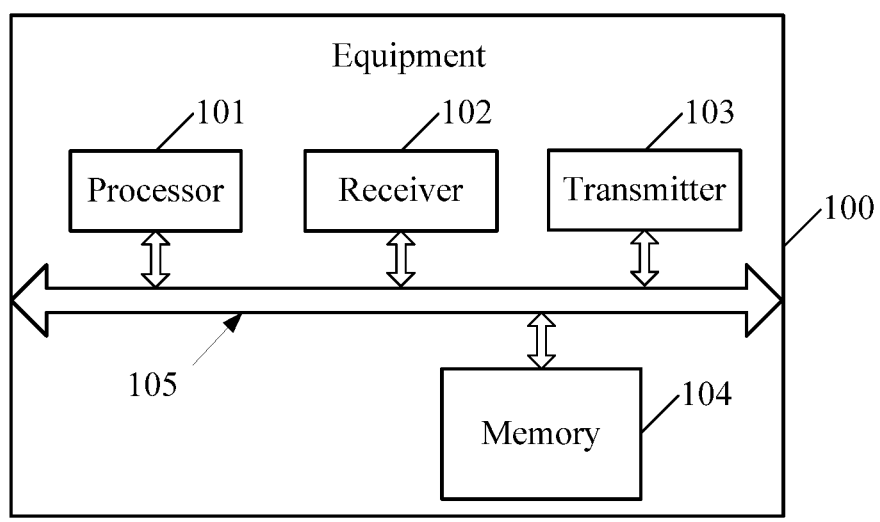
FIG. 6 is a schematic block diagram illustrating an equipment for regulating communication parameters according to another embodiment of the present disclosure.

It is to be noted that, in the embodiment of the present disclosure, the processing module 11 may be implemented by a processor, and the transceiver module 12 may be implemented by a receiver and a transmitter. As illustrated in FIG. 6, an equipment 100 may include a processor 101, a receiver 102, a transmitter 103 and a memory 104. Here, the memory 104 may be configured to store codes executed by the processor 101 and the like.

Various components in the equipment 100 are coupled together through a bus system 105. Here, the bus system 105 includes a data bus, and further includes a power bus, a control bus and a state signal bus.

It is to be understood that the equipment 100 according to the embodiment of the present disclosure may correspond to the equipment 10 in the embodiment of the present disclosure, and may correspond to a corresponding execution main body in the method according to the embodiment of the present disclosure, and that the abovementioned and other operations and/or functions of various modules in the equipment 100 are intended to implement the corresponding flows of each method in FIG. 1 and FIG. 2 respectively, and for simplicity, will not be elaborated herein.

Figure 7:
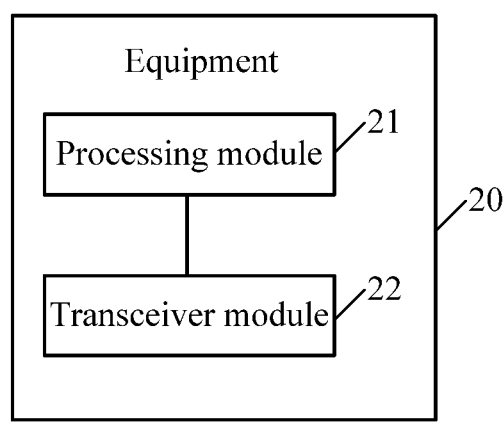
FIG. 7 is a schematic block diagram illustrating an equipment for regulating communication parameters according to yet another embodiment of the present disclosure.

FIG. 7 is a schematic block diagram illustrating an equipment for regulating communication parameters according to another embodiment of the present disclosure. As illustrated in FIG. 7, the equipment 20 includes a processing module 21 and transceiver module 22.

The processing module 21 is configured to establish a communication with first equipment according to preset configurations of communication parameters.

The transceiver module 22 is configured to receive communication parameter regulation indication information sent by the first equipment. The communication parameter regulation indication information may indicate a result of regulation performed by the processing module on the configurations of one or more of the communication parameters according to a network state and/or service state in a communication process.

In such a manner, the equipment for regulating the communication parameter in the embodiment of the present disclosure may receive the configurations of the communication parameters dynamically regulated by network equipment and/or terminal equipment communicating with the equipment according to the network state and/or the service state, so that performance and applicability of a wireless communication system are improved.

In an embodiment of the present disclosure, optionally, the transceiver module 22 is further configured to send processing capability indication information to the first equipment. The processing capability indication information may indicate that the equipment is capable of communicating with the first equipment by using the same parameter with different configurations.

In an embodiment of the present disclosure, optionally, the transceiver module 22 is specifically configured to send an attach request message to the first equipment. The attach request message include the processing capability indication information.

In an embodiment of the present disclosure, optionally, the transceiver module 22 is further configured to receive the preset configurations of the communication parameters from the first equipment. Here, the preset configurations of the communication parameters are determined by the first equipment according to at least one of: condition of a wireless channel transmission between the first equipment and the equipment, communication capabilities of the first equipment and the equipment and a service type for which the equipment initiates random access.

In an embodiment of the present disclosure, optionally, the transceiver module 22 is further configured to send parameter regulation request information to the first equipment for requesting regulation on the configurations of the one or more of the communication parameters, so as to cause the first equipment to regulate one or more of the communication parameters according to the parameter regulation request information.

In an embodiment of the present disclosure, optionally, the transceiver module 22 is further configured to receive ACK information, which indicates an ACK of successful reception of the parameter regulation request information, from the first equipment.

In an embodiment of the present disclosure, optionally, the transceiver module 22 is further configured to send state information, which indicates the network state and/or the service state, to the first equipment, so as to enable the first equipment to regulate the configurations of one or more of the communication parameters according to the state information.

In an embodiment of the present disclosure, optionally, the transceiver module 22 is specifically configured to: receive the parameter regulation indication information sent by the first equipment through a physical layer control channel. In an embodiment of the present disclosure, optionally, the communication parameters are multiple access manners for communication and/or basic physical layer parameters corresponding to the multiple access manners.

In an embodiment of the present disclosure, optionally, the network state includes at least one of: a channel environment between the first equipment and the equipment, a load and interference of a communication network where the first equipment and the equipment are located, a requirement of an application on a data rate, and a requirement of the application on energy consumption.

In an embodiment of the present disclosure, optionally, the first equipment is a network equipment and the equipment is terminal equipment; or the first equipment is a terminal equipment and the equipment is another terminal equipment.

It is to be understood that the equipment 20 according to the embodiment of the present disclosure may correspondingly execute the method 200 for regulating the communication parameter in the embodiment of the present disclosure, and the abovementioned and other operations and/or functions of various modules in the equipment 20 are intended to implement the corresponding flows of each method in FIG. 3 and FIG. 4 respectively, and for simplicity, will not be elaborated herein.

Figure 8:
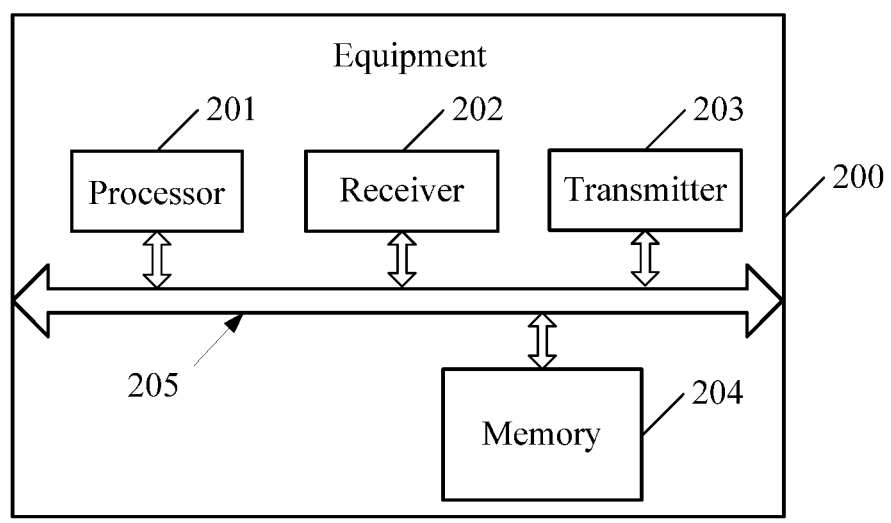
FIG. 8 is a schematic block diagram illustrating an equipment for regulating communication parameters according to still yet another embodiment of the present disclosure.

It is to be noted that, in the embodiment of the present disclosure, the processing module 21 may be implemented by a processor, and the transceiver module 22 may be implemented by a receiver and a transmitter. As illustrated in FIG. 8, an equipment 200 may include a processor 201, a receiver 202, a transmitter 203 and a memory 204. Here, the memory 204 may be configured to store codes executed by the processor 201 and the like.

Various components in the equipment 200 are coupled together through a bus system 205. Here, the bus system 205 includes a data bus, and further includes a power bus, a control bus and a state signal bus.

It is to be understood that the equipment 200 according to the embodiment of the present disclosure may correspond to the equipment 20 in the embodiment of the present disclosure, and may correspond to a corresponding execution main body in the method according to the embodiment of the present disclosure, and the abovementioned and other operations and/or functions of various modules in the equipment 200 are intended to implement the corresponding flows of various methods in FIG. 3 and FIG. 4 respectively, and for simplicity, will not be elaborated herein. Those skilled in the art may realize that the units and algorithm steps of various examples described in conjunction with the embodiments disclosed in the present disclosure may be implemented by electronic hardware, computer software or a combination of the two. Whether these functions are executed in a hardware or software manner depends on specific applications and design constraints of the technical solutions. Those skilled in the art may realize the described functions for each specific application by virtue of different methods, but such realization shall fall within the scope of the present disclosure.

Those skilled in the art may clearly appreciate that specific working processes of the system, device and unit described above may refer to the corresponding processes in the method embodiment for convenient and brief description and will not be elaborated herein.

In some embodiments provided by the present disclosure, it is to be understood that the disclosed system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be omitted or not executed. In addition, coupling or direct coupling or communication connection between various components as illustrated or as discussed may be indirect coupling or communication connection, implemented through some interfaces, of the device or the units, and may be electrical and mechanical or adopt other forms.

The units described as separate parts may or may not be physically separated, and parts illustrated as units may or may not be physical units, and namely may be located in the same place, or may be distributed to multiple network units. Part or all of the units may be selected to achieve the purpose of the solutions of the embodiments according to a practical requirement.

In addition, various function units in various embodiment of the present disclosure may be integrated into a processing unit, or various units may exist independently, or two or more than two units may be integrated into a unit.

When being implemented in form of software function unit and sold or used as an independent product, the function may also be stored in a computer-readable storage medium. Based on such an understanding, the technical solutions of the present disclosure substantially or parts making contributions to the conventional art or part of the technical solutions may be embodied in form of software product. The computer software product is stored in a storage medium, including a plurality of instructions configured to enable a computer device (which may be a personal computer, a server, network equipment or the like) to execute all or part of the steps of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure is defined by the scope of protection of the claims.

The invention claimed is:

1. A method for regulating a communication parameter, comprising:
   establishing, by first equipment, a communication with second equipment according to a preset configuration of a Cyclic Prefix (CP) length;
   regulating, by the first equipment, the configuration of the CP length according to a network state and/or service state in a communication process; and
   sending, by the first equipment, CP length regulation indication information to the second equipment, the CP length regulation indication information indicating a result of regulation performed by the first equipment on the configuration of the CP length, the result of regulation being represented in form of a relative value, and the relative value being a difference value between regulated CP length and unregulated CP length;
   wherein the first equipment is network equipment, and the second equipment is terminal equipment;
   wherein sending, by the first equipment, the CP length regulation indication information to the second equipment comprises:
   sending the CP length regulation indication information to the second equipment through a physical layer control channel.

2. The method as claimed in claim 1, wherein the network state comprises a channel environment between the first equipment and the second equipment.

3. The method as claimed in claim 1, wherein the preset configuration of the CP length is a configuration predetermined by the first equipment and the second equipment in a random access process.

4. The method as claimed in claim 1, further comprising:
   sending, by the first equipment, a random access response message to the second equipment, wherein the preset configuration of the CP length is contained in the random access response message.

5. A method for regulating a communication parameter, comprising:
   establishing, by second equipment, a communication with first equipment according to a preset configuration of a Cyclic Prefix (CP) length; and
   receiving, by the second equipment, CP length regulation indication information sent by the first equipment, the CP length regulation indication information indicating a result of regulation performed by the first equipment on the configuration of the CP length according to a network state and/or service state in a communication process, the result of regulation being represented in form of a relative value, and the relative value being a difference value between regulated CP length and unregulated CP length;
   wherein the first equipment is network equipment, and the second equipment is terminal equipment;
   wherein receiving, by the second equipment, the CP length regulation indication information sent by the first equipment comprises:
   receiving the CP length regulation indication information sent by the first equipment through a physical control channel.

6. The method as claimed in claim 5, wherein the network state comprises a channel environment between the first equipment and the second equipment.

7. The method as claimed in claim 5, wherein the preset configuration of the CP length is a configuration predetermined by the first equipment and the second equipment in a random access process.

8. The method as claimed in claim 5, further comprising:
receiving, by the second equipment, a random access response message sent by the first equipment, wherein the preset configuration of the CP length is contained in the random access response message.

9. Network equipment for regulating a communication parameter, comprising:
a processor; and
a memory configured to store instructions executable for the processor,
wherein the processor is configured to:
establish a communication with terminal equipment according to a preset configuration of a Cyclic Prefix (CP) length,
regulate the configuration of the CP length according to a network state and/or service state in a communication process; and
send CP length regulation indication information to the terminal equipment, the CP length regulation indication information indicating a result of regulation performed by the network equipment on the configuration of the CP length, the result of regulation being represented in form of a relative value, and the relative value being a difference value between regulated CP length and unregulated CP length;
wherein the processor is specifically configured to:
send the CP length regulation indication information to the terminal equipment through a physical control channel.

10. The network equipment as claimed in claim 9, wherein the network state comprises a channel environment between the network equipment and the terminal equipment.

11. The network equipment as claimed in claim 9, wherein the preset configuration of the CP length is a configuration predetermined by the network equipment and the terminal equipment in a random access process.

12. The network equipment as claimed in claim 9, wherein the processor is specifically configured to:
send a random access response message to the terminal equipment, wherein the preset configuration of the CP length is contained in the random access response message.

13. Terminal equipment for regulating a communication parameter, comprising:
a processor; and
a memory configured to store instructions executable for the processor,
wherein the processor is configured to:
establish a communication with network equipment according to a preset configurations of a Cyclic Prefix (CP) length; and
receive CP length regulation indication information sent by the network equipment, the CP length regulation indication information indicating a result of regulation performed by the processing module on the configuration of the CP length according to a network state and/or service state in a communication process, the result of regulation being represented in form of a relative value, and the relative value being a difference value between regulated CP length and unregulated CP length:
wherein the processor is specifically configured to:
receive the CP length regulation indication information sent by the network equipment through a physical control channel.

14. The terminal equipment as claimed in claim 13, wherein the network state comprises a channel environment between the network equipment and the terminal equipment.

15. The terminal equipment as claimed in claim 13, wherein the preset configuration of the CP length is a configuration predetermined by the network equipment and the terminal equipment in a random access process.

16. The terminal equipment as claimed in claim 13, wherein the processor is specifically configured to:
receive a random access response message sent by the network equipment, wherein the preset configuration of the CP length is contained in the random access response message.

* * * * *